United States Patent [19]
Bos et al.

[11] Patent Number: 4,652,087
[45] Date of Patent: Mar. 24, 1987

[54] METHOD AND APPARATUS FOR REDUCING OPTICAL CROSS TALK IN A LIQUID CRYSTAL OPTICAL SWITCH

[75] Inventors: Philip J. Bos, Portland; Dennis Prince, Hillsboro, both of Oreg.

[73] Assignee: Tektronix, Inc., Beaverton, Oreg.

[21] Appl. No.: 640,266

[22] Filed: Aug. 13, 1984

[51] Int. Cl.$^4$ ............................................. G02F 1/13
[52] U.S. Cl. ................................. 350/332; 350/347 E
[58] Field of Search ................ 350/332, 347 E, 331 R

[56] References Cited

U.S. PATENT DOCUMENTS

| | | | |
|---|---|---|---|
| 3,694,053 | 9/1972 | Kahn | 350/347 E |
| 4,097,128 | 6/1978 | Matsumoto et al. | 350/347 E |
| 4,566,758 | 1/1986 | Bos | 350/347 E X |
| 4,582,396 | 4/1986 | Bos et al. | 350/347 E |
| 4,583,825 | 4/1986 | Buzak | 350/347 E |

Primary Examiner—John K. Corbin
Assistant Examiner—Richard F. Gallivan
Attorney, Agent, or Firm—John D. Winkelman; Paul S. Angello

[57] ABSTRACT

A field sequential color display system (10) employs a liquid crystal device operating as a variable optical retarder (12) which is positioned in front of the screen (40) of a raster scanned cathode ray tube (38) to develop a high quality multicolored image. The liquid crystal device is divided into upper and lower cell segments (34 and 36) to decrease the time between successive color fields. Each cell segment has a separate electrode structure (30 and 32) and a common electrode structure (22) and is separately commanded by a switching circuit (46) to a predetermined optical retardation state when the electron beam scans the portion of the screen covered by the cell segment. The switching circuit provides signals in a predetermined time sequence to the cell segments to minimize the optical cross talk between them and thereby minimize the spurious transmission of colored light from the display system.

22 Claims, 8 Drawing Figures

METHOD AND APPARATUS FOR REDUCING OPTICAL CROSS TALK IN A LIQUID CRYSTAL OPTICAL SWITCH

TECHNICAL FIELD

The present invention relates to color display systems and, in particular, to a method and an apparatus for electrically driving a multi-segment liquid crystal switching device to reduce the optical cross talk among the cell segments and thereby decrease the time between successive color fields, and improve the image color quality, of the display system.

BACKGROUND OF THE INVENTION

High performance field sequential liquid crystal color display systems can develop high resolution multicolored images with strong contrast and good color purity. However, a well-known problem associated with liquid crystal switching devices may cause display systems incorporating them to produce colored images of relatively poor quality. Specifically, the speed of response of a liquid crystal device is known to be relatively slow in switching from the field-aligned ("ON") state to the relaxed ("OFF") state. This causes the information of one color field to be displayed in the color of the immediately preceding color field during the transition from the "ON" state to the "OFF" state of the device.

A solution to this problem is suggested in U.S. Pat. No. 4,295,093 of Middleton who describes a spectrum analyzer which employs a liquid crystal switching device that is split into first and second contiguous regions of liquid crystal material, each of which is controlled separately by a voltage applied by a different output of a drive circuit. Both regions share a common electrode which is held at a fixed reference potential. In Column 4, lines 21-38, the Middleton patent describes with reference to FIG. 2 thereof the construction of the liquid crystal device as follows. "[The device] consists of a film 20 of liquid crystal material of the twisted nematic kind . . . One side of the film 20 is provided with a single transparent electrode 21 which is held at a fixed potential, and the other side is provided with two transparent electrodes 22 and 23 which each cover a respective half of the film, and these are connected to the colour select circuit 15 via conductors 24 and 25."

The above-described liquid crystal device is positioned in front of a cathode ray tube screen that is raster scanned by an electron beam. The split line separating the first and second contiguous regions of the liquid crystal device is oriented substantially parallel to the line scanning direction of the raster scanning pattern. In operation, the first region is scanned in its first color state while the second region of the liquid crystal material is switched from a second color state to a first color state. Upon completion of the scan of the first region, the second region is scanned in its first color state while the first region is switched from the first color state to the second color state.

Alternate switching between color states of the first and second regions of the liquid crystal device allows the previously scanned region to settle to its other color state prior to the return of the electron beam to scan that region of the display.

U.S. Pat. No. 4,328,493 of Shanks et al. describes a color display which employs a liquid crystal device constructed with first and second contiguous regions of liquid crystal material as in the Middleton patent. The Shanks et al. patent describes a timing sequence for signals developed at the outputs of a drive circuit which applies AC pulses of one of two frequencies alternately to the first and second regions of liquid crystal material. Light rays of two colors alternately appearing at the output form a multicolored image in a manner similar to that described in the Middleton patent.

The liquid crystal devices described in the Middleton and Shanks et al. patents suffer from the disadvantage of introducing optical cross talk between the contiguous regions of the liquid crystal device. The optical cross talk is characterized in that the electric field applied to the region being scanned by the electron beam is coupled to the unscanned region and causes a spurious transmission of light from it. The two contiguous regions of liquid crystal material are, therefore, not electrically isolated from and optically independent of each other. The result is a color display system with degraded image quality.

One of the objects of this invention is to provide a high performance field sequential liquid crystal color display system that develops a high resolution multicolored image with strong contrast and good color purity.

Another object of this invention is to provide in a display system a liquid crystal switching device that is divided into cell segments which are driven by electrical signals presented in a predetermined sequence to minimize the amount of optical cross talk among the cell segments.

A further object of this invention is to provide in a display system a method and an apparatus for separately driving the cell segments of a liquid crystal switching device to decrease the time between successive color fields and thereby improve the image color quality of the display system.

Still another object of this invention is to provide such a method and an apparatus for driving a liquid crystal device whose cell segments share a common electrode structure.

SUMMARY OF THE INVENTION

The present invention relates to a method and an apparatus for electrically driving a liquid crystal device operating as a high-speed optical switch in a preferred field sequential color display system. The liquid crystal device has three electrode structures formed into two cell segments of the type described in the Middleton and Shanks et al. patents and includes a liquid crystal material captured between a pair of spaced-apart and generally parallel transparent substrates. One substrate has a pair of contiguous conductive regions that comprise first and second electrode structures, and the other substrate has a single conductive region that comprises a common electrode structure. The first and common electrode structures define a first cell segment, and the second and common electrode structures define a second cell segment.

The method of the present invention includes the steps of applying an excitation potential difference between the first and common electrode structures of the first cell segment during a first time interval to bias the first cell segment to its "ON" state, and applying an excitation potential difference between the second and common electrode structures of the cell segment during a second time interval to bias the second cell segment to its "ON" state. To minimize optical cross talk between the first and second cell segments while the second cell segment is biased in its "ON" state during the second time interval, a high impedance condition is introduced between the first and common electrode structures for at least part of the time while the second cell segment is biased in its "ON" state. The above-described method can be practiced in an analogous manner to minimize the optical cross talk between the first and second cell segments while the first cell segment is biased in its "ON" state.

The apparatus of the present invention is a switching circuit that has a separate output to electrically drive a different one of the cell segments. The switching circuit is operable to carry out the above-described method steps. The principles underlying the operation of the switching circuit are as follows. Whenever one cell segment is biased in its "ON" state, a noise voltage signal appears on the common electrode structure, which is grounded. Since it is induced on the common electrode structure, the noise voltage signal is coupled to the other cell segment. Whenever the other cell segment is biased in the "OFF" state, the switching circuit develops the high impedance condition that allows the noise voltage to be induced on the separate electrode structure of the other cell segment. The appearance of the noise voltage signal on both electrode structures creates no change in potential difference across the cell segment in the "OFF" state and thereby optically isolates both cell segments.

In the preferred field sequential color display system, the liquid crystal device is positioned in front of and receives light rays from the screen of a raster scanned cathode ray tube. The liquid crystal device operates as a variable optical retarder and is disposed between color selective and neutral light polarizing filters. The polarizing filter receiving the light rays from the cathode ray tube defines the polarization state of the light rays incident to the variable optical retarder. The variable optical retarder changes the character of the polarization state of the light rays passing therethrough in response to a voltage applied by the switching means or circuit. The variable optical retarder produces a first amount of optical retardation to develop a display system light output in one color and a second amount of optical retardation to develop a display system light output in a second color. The first amount is essentially zero retardation of light rays of all wavelengths, and the second amount is substantially half-wave retardation of light rays of the wavelength of one of the colors developed at the display system output.

The liquid crystal variable optical retarder is divided into a first or upper cell segment and a second or lower cell segment. Each cell segment is separately driven in a predetermined time sequence by a different output of the switching circuit of the present invention to cause in each color field the display of one-half of the light image information developed by the raster scanned cathode ray tube.

Additional objects and advantages of the present invention will be apparent from the following detailed description of a preferred embodiment thereof, which proceeds with reference to the accompanying drawings.

DETAILED DESCRIPTION OF PREFERRED EMBODIMENT

General Arrangement and Operation of the Color Display System

Figure 1:
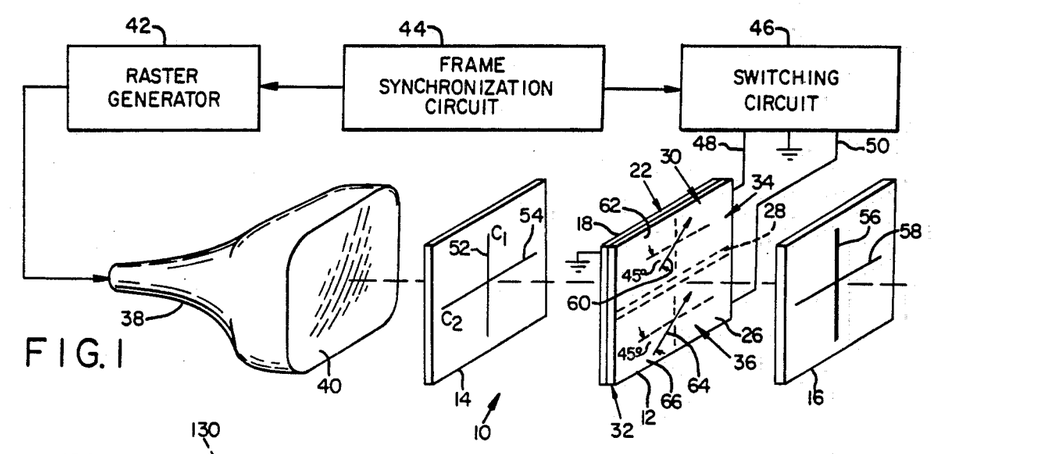
FIG. 1 is a simplified block diagram of a field sequential color display system incorporating a liquid crystal variable optical retarder that is driven by a sequence of electrical signals developed in accordance with the present invention.

With reference to FIG. 1, a preferred embodiment of a field sequential color display system 10 designed in accordance with the present invention includes a liquid crystal device or variable optical retarder 12 which is in optical communication with and is disposed between color selective polarizing filter 14 and neutral polarizing filter 16. The input surface 18 of variable optical retarder 12 comprises a common electrode structure 22. The output surface 26 of the variable optical retarder 12 is divided along a horizontal nonconductive split line 28 into two separate electrode structures 30 and 32. Electrode structures 22 and 30 define a first or upper cell segment 34, and electrode structures 22 and 32 define a second or lower cell segment 36 as shown.

Color selective polarizing filter 14 has orthogonally related polarization states, one polarization state passing light of only a first color and the other polarization state passing light of only a second color. Neutral polarizing filter 16 has two orthogonally related polarization states, one polarization state passing light of all colors and the other polarization state absorbing light of all colors. In a preferred embodiment of the color display system, polarizing filters 14 and 16 have mutually orthogonally aligned linear polarization axes.

The optical assembly formed by variable optical retarder 12 and polarizing filters 14 and 16 comprises a high-speed color switch that is positioned in front of a source of light or image source 38 which emits light from phosphor screen 40 to produce a light image in two primary colors, e.g., red and green. In a preferred embodiment of the display system, image source 38 constitutes a cathode ray tube which by means of television type raster scan a signal produced by raster generator 42 in response to the output of frame synchronization circuit 44 presents sequential frames of image information. Each frame includes two fields of image color information in alternating first and second color field time intervals.

In the first color field time interval, information pertaining to both the form of any image which is to appear in a first color, such as red, and the form of any image which is to appear in a color that is a combination of the color red and a second color, such as green, is written on phosphor screen 40. In the second color field time interval, information pertaining to both the form of any image which is to appear in the color green and any form of any image which is to appear in a color that is a combination of the colors red and green is written on phosphor screen 40. Color selective polarizing filter 14 receives the light transmitted from phosphor screen 40 and orthogonally and linearly polarizes it in the red and green colors. The polarized light is then transmitted to input surface 18 of variable optical retarder 12.

Switching means or circuit 46 receives at its input a signal from the output of frame synchronization circuit 44 to drive variable optical retarder 12 synchronously with the sequential frame rate of image information produced by image source 38. In each image frame, switching circuit 46 delivers signals to each cell segment in a time sequence according to the present invention to develop the desired color of light exiting the display system. During the first color field time interval, switching circuit 46 commands the cell segments 34 and 36 of variable optical retarder 12 to the partly relaxed or "OFF" state which causes an orientation of its optic axis that accomplishes substantially half-wave retardation of light of the color green passing through polarizing filter 14. Essentially no light of the color green passes through the linear polarizer 16 during this time interval, and the undesired image components in the color green which appeared on phosphor screen 40 during the first time interval are thereby eliminated. During the second color field time interval, switching circuit 46 commands the cell segments 34 and 36 of variable optical retarder 12 to the field-aligned or "ON" state which causes an orientation of its optic axis that accomplishes essentially zero retardation of light of both of the colors red and green passing through polarizing filter 14. The absorption axis of neutral polarizing filter 16 absorbs light only of the color red as will be further hereinafter described.

Figure 2:
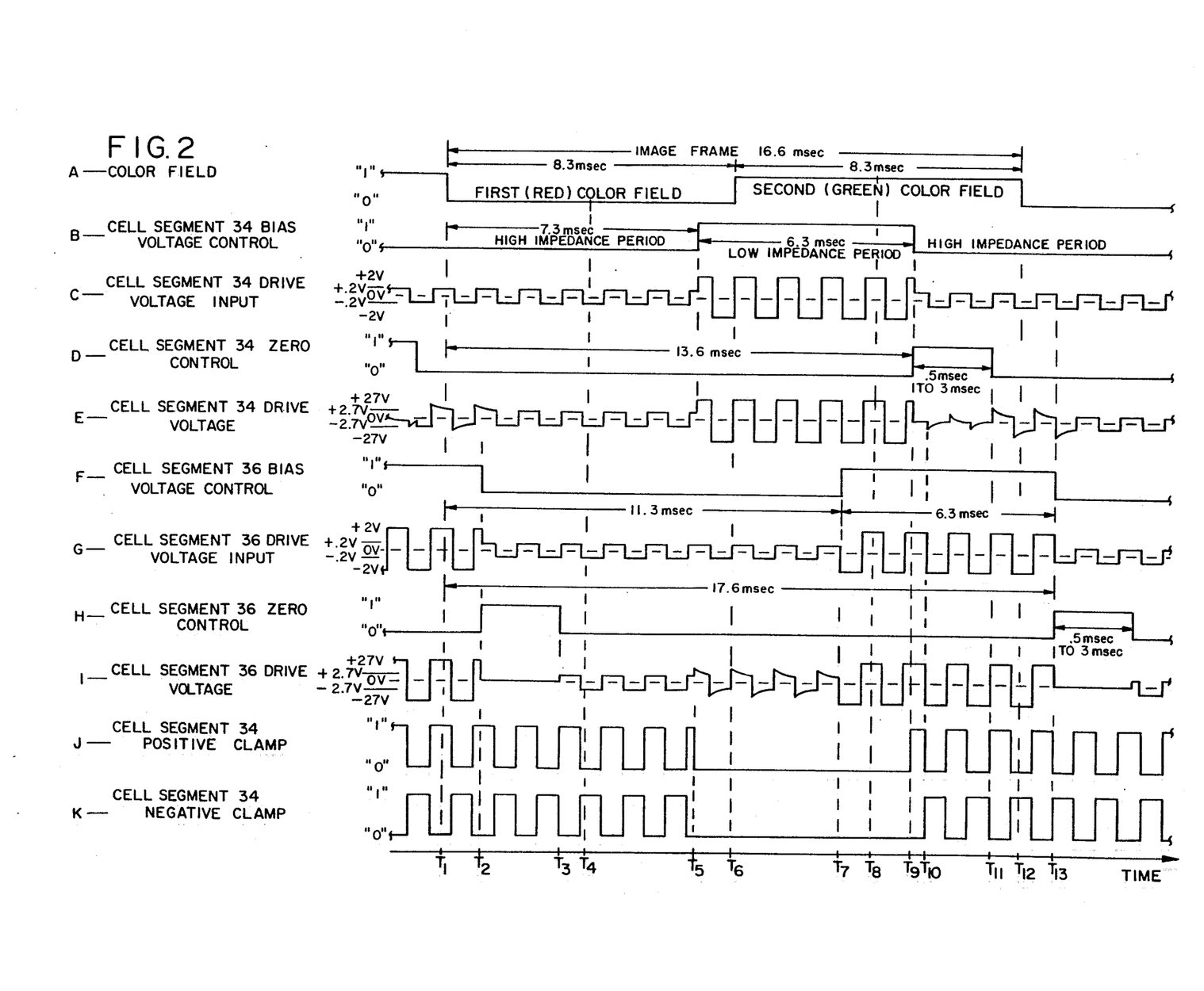
FIG. 2 is a timing diagram illustrating the timing relationship of the switching signals applied to the cell segments of the liquid crystal device that is incorporated in the display system of FIG. 1.

FIG. 2 is a timing diagram which shows the timing relationship between the signals utilized to control in the proper sequence the optical retardation states of cell segments 34 and 36 to develop the two color fields of an image frame. FIG. 2 also shows typical values for certain time intervals between the reference points indicated on the time axis. As indicated on line A, the first color field time interval spans the time from $T_1$ to $T_6$ and the second color field time interval spans the time from $T_6$ to $T_{12}$. Lines B, C, and D represent the signals produced within switching circuit 46 that develop at its output 48 the DRIVE VOLTAGE signal which is applied to electrode structure 30 of cell segment 34 and is shown on line E. Lines F, G, and H represent the signals produced within switching circuit 46 that develop at its output 50 the DRIVE VOLTAGE signal which is applied to electrode structure 32 of cell segment 36 and is shown on line I. Common electrode structure 22 of cell segments 34 and 36 is connected to the electrical reference of switching circuit 46, which reference is preferably ground. Lines J and K represent control signals applied to the drive circuitry of cell segments 34 and 36 for purposes that will be described later.

To decrease the time between successive color fields, each of the first and second color field time intervals is subdivided into first and second subintervals. As shown in FIG. 2, the first subinterval of the first color field spans the time from $T_1$ to $T_4$ and the second subinterval of the first color field spans the time from $T_4$ to $T_6$.

From $T_1$ to $T_4$, cell segment 34 is in the "OFF" state, receives the light rays produced by the scanning electron beam, and causes red light to exit the display system output covered by cell segment 34. From $T_4$ to $T_6$, cell segment 36 is in the "OFF" state, receives the light rays produced by the scanning electron beam, and causes red light to exit the display system output covered by cell segment 36. As shown on lines E and I, 5.4 volt peak-to-peak or 2.7 Vrms bipolar square wave pulses of between 1 kHz and 4 kHz bias the respective cell segments 34 and 36 to the "OFF" state. Cell segment 36 is commanded to remain in the "ON" state from $T_1$ to $T_2$ to delay the change to the "OFF" state of the first color field of the image frame shown until the light emitted from the phosphors on screen 40 during the second color field of the immediately preceding image frame sufficiently decay. This delay ensures that continuity of color in the composite image exists for each color field.

As shown on line E, from $T_1$ to $T_2$ the pulse top of the DRIVE VOLTAGE signal to cell segment 34 overshoots and sags to its nominal peak amplitude of 2.7 volts. The overshoot and sag of the pulse top is the result of electrical cross talk that is induced by a noise voltage signal produced on common electrode structure 22 by the 54 volt peak-to-peak or 27 Vrms DRIVE VOLTAGE signal applied to cell segment 36 (line I) during this time. Appreciable electrical cross talk of this character occurs when only one of the cell segments is driven by a 54 volt peak-to-peak ("ON" state) signal. The switching circuit is designed so that its output impedance presented to electrode structure 30 of cell segment 34 during the "OFF" state is sufficiently high to track the noise voltage induced on common electrode structure 22 of cell segments 34 and 36. The potential difference between electrode structures 30 and 22 of cell segment 34 is, therefore, unaffected by the electrical cross talk resulting from such noise voltage and thereby prevents optical cross talk from occurring between the cell segments. Such electrical cross talk also appears on electrode structure 30 (line E) from $T_9$ to $T_{13}$ and on electrode structure 32 (line I) from $T_5$ to $T_7$.

As shown on line E, cell segment 34 is commanded to the "ON" state at $T_5$ prior to the time the electron beam begins to scan into the region of screen 40 covered by cell segment 36. Switching cell segment 34 at $T_5$ provides sufficient time for the liquid crystal molecules to stabilize in the "ON" state prior to the start at $T_6$ of the first subinterval of the second color field time interval. As shown on line I, cell segment 36 is commanded to the "ON" state at $T_7$ prior to the time the electron beam begins to scan into the region of screen 40 covered by cell segment 36. Switching cell segment 36 at $T_7$ provides sufficient time for the liquid crystal molecules to stabilize in the "ON" state prior to the start at $T_8$ of the second subinterval of the second color field time interval. As shown on lines E and I, 54 volt peak-to-peak bipolar square wave pulses of between 1 kHz and 4 kHz bias the respective cell segments 34 and 36 to the "ON" state. Switching circuit 46 is designed so that its output impedance presented to the electrode structure of the cell segment is very low to enable the delivery of pulses of high voltage.

As indicated on line A, the first subinterval of the second color field spans the time from $T_6$ to $T_8$ and the second subinterval of the second color field spans the time from $T_8$ to $T_{12}$. From $T_6$ to $T_8$, cell segment 34 is in the "ON" state, receives the light rays produced by the scanning electron beam, and causes green light to exit the display system output covered by cell segment 34. From $T_8$ to $T_{12}$, cell segment 36 is in the "ON" state, receives the light rays produced by the scanning electron beam, and causes green light to exit the display system output covered by cell segment 36. Cell segments 34 and 36 are commanded to remain in the "ON" state from, respectively, $T_8$ to $T_9$ and $T_{12}$ to $T_{13}$ to delay the change to the "OFF" state of the first color field of the next succeeding image frame for the same reason described hereinabove for the time from $T_1$ to $T_2$.

As indicated on lines B and D, at $T_9$ the BIAS VOLTAGE CONTROL signal of cell segment 34 changes to a logic "0" state and the ZERO CONTROL signal of cell segment 34 changes to a logic "1" state. During the time the ZERO CONTROL signal is in the logic "1" state, the DRIVE VOLTAGE signal (line E) of cell segment 34 is set to a high impedance ground condition to allow the cell segment to quickly relax to the "OFF" state. As shown on line E, the high impedance ground condition for cell segment 34 lasts from $T_9$ to $T_{11}$. The DRIVE VOLTAGE signal during this time is zero volts, although from $T_{10}$ to $T_{11}$ there is present a small amount of cross talk which is induced by the 54 volt peak-to-peak DRIVE VOLTAGE signal (line I) applied to cell segment 36 during that time. After the ZERO CONTROL signal changes to a logic "0" state, the DRIVE VOLTAGE signal at output 48 of switching circuit 46 remains in a high impedance output condition with a 5.4 volt peak-to-peak bipolar square wave signal. This signal represents a "holding" or bias voltage that may be used to keep cell segment 34 in the "OFF" state. Such a bias voltage is often not required in display systems operating at relatively fast frame rates. In such systems, the voltage may be zero from times $T_1$ to $T_5$ and $T_9$ to $T_{13}$. As shown on line I, the high impedance ground condition for cell segment 36 takes place from $T_2$ to $T_3$. Only a small amount of cross talk is induced because the 5.4 volt peak-to-peak DRIVE VOLTAGE signal (line E) is applied to cell segment 34 during that time.

As shown on line E, cell segment 34 is commanded to the "OFF" state at $T_9$ after the electron beam has begun to scan into the region of screen 40 covered by cell segment 36. Switching cell segment 34 at $T_9$ provides sufficient time for the liquid crystal molecules to stabilize in the "OFF" state prior to the start at $T_{12}$ of the first color field time interval for the next succeeding image frame. The above-described process is repeated for successive image frames.

The alternating image information fields provided in the first and second color field time intervals are transmitted through color selective polarizing filter 14 and are synchronously transmitted by variable optical retarder 12 and neutral polarizing filter 16. The retinal persistence of an observer's eye integrates the information presented at the output of polarizing filter 16 during the two intervals of time corresponding to alternate fields of the television raster signal to create the impression of a single, multicolored image. Intensity modulation of the light image source will produce a color gamut within a spectral range of between the red and green colors.

Optical Component Orientation

With reference to FIG. 1, polarizing filter 14 has a color selective vertical polarization axis 52 which passes light of a color $C_1$, such as red, and a color selective horizontal polarization axis 54 which passes light of a color $C_2$, such as green. Polarizing filter 16 has a light absorbing vertical polarization axis 56 which passes no light and a light transmitting horizontal polarization axis 58 which passes light of all wavelengths.

Variable optical retarder 12 includes nematic liquid crystal cell segments 34 and 36, each comprising a zero to substantially half-wave optical retarder which selectively provides in the "ON" state essentially zero retardation for normally incident light of all colors and in the "OFF" state substantially half-wave retardation of normally incident green light. The projection 60 of the optic axis of cell segment 34 on its light communicating surface 62 and the projection 64 of the optic axis of cell segment 36 on its light communicating surface 66 are disposed substantially at 45° angles with respect to each one of the polarization axes of polarizing filters 14 and 16, which axes are depicted in phantom lines on surfaces 62 and 66 of variable optical retarder 12.

Each cell segment 34 and 36 of variable optical retarder 12 is independently switched between the two optical retardation states. The two optical retardation states provide display system 10 with two selectable optical transmission states, each of which develops a display system output of red or green light.

Whenever either one of the cell segments of variable optical retarder 12 is commanded to the "OFF" optical retardation state by a voltage signal applied to an output conductor of switching circuit 46, the direction of polarization of normally incident light rays of the color green passing through horizontal polarization axis 54 of polarizing filter 14 is rotated at a 90° angle. Light rays of the color green are projected onto and absorbed by the vertical polarization axis 56 of polarizing filter 16. The direction of polarization of normally incident light rays of the color red passing through vertical polarization axis 52 of polarizing filter 14 is rotated at an angle which is slightly different from 90° by variable optical retarder 12 in the "OFF" state. Light rays of the color red, therefore, are separated into components which lie along the vertical and horizontal polarization axes of polarizing filter 16. Light rays of the color red include major components of light projected onto and transmitted by horizontal polarization axis 58 and minor components of light projected onto and absorbed by vertical polarization axis 56 of polarizing filter 16.

Red light of pure quality exits display system 10, therefore, in its first optical transmission state. The slight amount of red light absorbed by vertical polarization axis 56 of polarizing filter 16 results in a virtually imperceptible diminution in red light intensity in the first optical transmission state.

Whenever either one of the cell segments of variable optical retarder 12 is commanded to the "ON" optical retardation state by a voltage signal applied to an output conductor of switching circuit 46, the directions of polarization of light rays of the color red passing through vertical polarization axis 52 and of the color green passing through horizontal polarization axis 54 of polarizing filter 14 are unchanged as the light rays pass through variable optical retarder 12 and strike polarizing filter 16. Normally incident light rays of the color red are absorbed by vertical polarization axis 56, and normally incident light rays of the color green exit display system 10 through horizontal polarization axis 58 of polarizing filter 16. Green light of pure quality exits display system 10, therefore, in its second optical transmission state.

Table I summarizes the color of light exiting display system 10 in each one of the two above-described optical transmission states.

TABLE I

| Optical Transmission State | Variable Optical Retarder 12 | Color of Light Output |
|---|---|---|
| 1 | OFF | Red |
| 2 | ON | Green |

Construction of the Liquid Crystal Device

The preferred embodiment of the display system incorporates a liquid crystal device 12 or cell whose electrode structures are formed into cell segments as described in the Middleton and Shanks et al. patents. The description herein of the construction of liquid crystal cell 100 also applies to device 12. In particular, with reference to FIG. 4, a liquid crystal cell 100 comprises a common electrode structure 102 which is spaced apart and generally parallel to a contiguous pair of electrode structures, first electrode structure 104 and second electrode structure 108. A continuous region of nematic liquid crystal material 110 is captured within the space between electrode structure 102 and electrode structures 104 and 108. Electrode structure 102 comprises glass dielectric substrate 112 which is substantially flat and has on its inner surface a layer or region 114 of electrically conducting, optically transparent material, such as indium tin oxide. Director alignment film layer 116 is applied to conductive layer 114 and forms a boundary between electrode structure 102 and liquid crystal material 110.

Figures 3, 4:
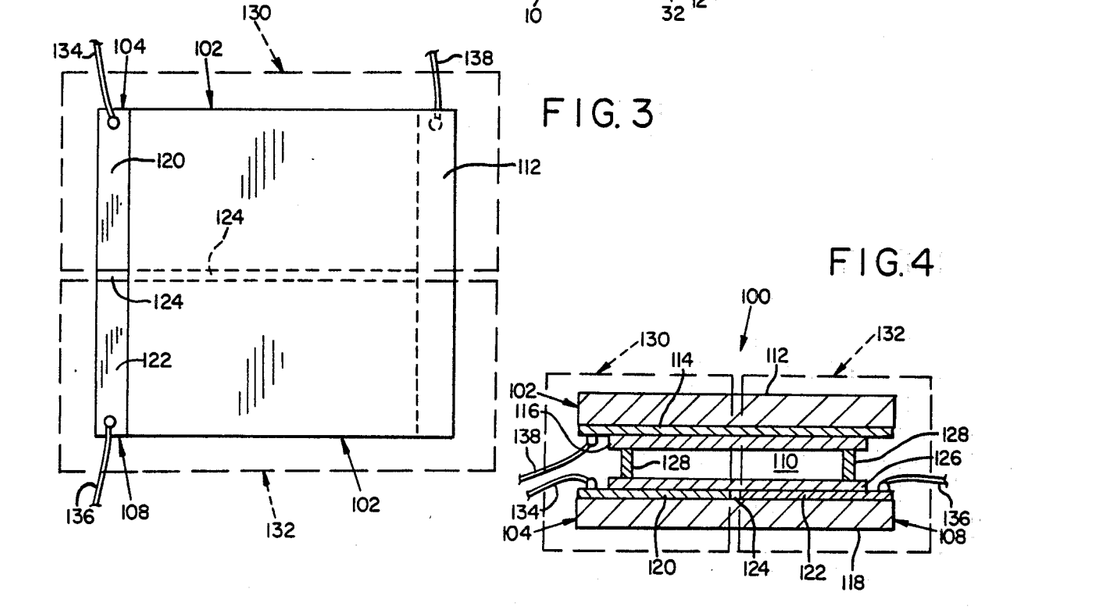
FIG. 3 is an enlarged plan view of the liquid crystal device incorporated in the display system of FIG. 1.
FIG. 4 is a diagrammatic elevation view of the left or right side of the liquid crystal device of FIG. 3.

Electrode structures 104 and 108 have a common glass dielectric substrate 118 which is substantially flat and has on its inner surface two contiguous layers or regions 120 and 122 of electrically conducting, optically transparent material. Conductive region 120 forms a portion of the first electrode structure 104, and conductive region 122 forms a portion of the second electrode structure 108. Conductive regions 120 and 122 are separated by a straight, nonconductive gap or split line 124. Director alignment film layer 126 is applied to conductive regions 120 and 122 and forms a boundary between liquid crystal material 110 and electrode structures 104 and 108. The material constituting and the corresponding method of conditioning director alignment films 116 and 126 are described in detail later.

Spacers 128 may be comprised of any suitable material, such as polyester film or fused glass frit, and serve to maintain the desired separation between glass substrates 112 and 118. Electrode structures 102 and 104 define a first cell segment 130, and electrode structures 102 and 108 define a second cell segment 132. Cell segments 130 and 132 are included within the broken line outlines shown in FIGS. 3 and 4.

When liquid crystal cell 100 is incorporated in a display system such as display system 10, a series of separate voltage signals independently developed at the outputs of switching circuit 46 (FIG. 1), are applied to cell segments 130 and 132 at terminals 134 and 136, respectively. A common reference potential for cell segments 130 and 132 is applied to terminal 138, which is preferably connected to the ground potential of switching circuit 46 (FIG. 1).

During display system operation, noise voltage signals are induced on the grounded electrode structure by a cell segment whose electric field intensity is changed to switch the cell segment between optical retardation states. The method of the present invention for sequentially driving cell segments 130 and 132 minimizes the effect of such noise voltage signals on the character of the electric field within the adjacent cell segment. The coupling of the noise voltage signals to both electrode structures of the adjacent cell segment minimizes the optical cross talk between cell segments. The spurious transmission of colored light which is caused by optical cross talk is thereby eliminated from the display system.

It will be appreciated by those skilled in the art that a liquid crystal device can be divided into more than two cell segments and be electrically driven as described above to accomplish the above performance objective. Additionally, when designed with a common electrode structure, other liquid crystal devices, such as, for example, a twisted nematic device, can be electrically driven as described above to provide reduced optical cross talk in color display systems incorporating them.

Liquid Crystal Variable Optical Retarder

The preferred embodiment of display system 10 of the present invention incorporates variable optical retarder 12 that comprises a liquid crystal device which is divided into two cell segments, each operating as a zero to substantially half-wave optical retarder. The molecular alignment configurations of the liquid crystal material captured within cell segment 130 of liquid crystal cell 100 are described herein by way of example to explain the operation of the cell segment as a variable optical retarder. The description herein also applies to cell segment 132. For purposes of clarity, reference is sometimes made to the operation of switching circuit 46 of FIG. 1 to describe the switching between optical retardation states.

Figure 5A:
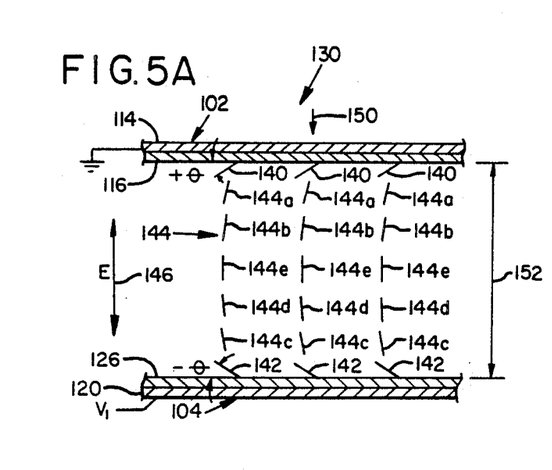
FIGS. 5A and 5B are schematic diagrams of the director alignment configuration of one of the cell segments of the liquid crystal device of FIG. 3 in, respectively, the field-aligned ("ON") state and the partly relaxed ("OFF") state.
Figure 5B:
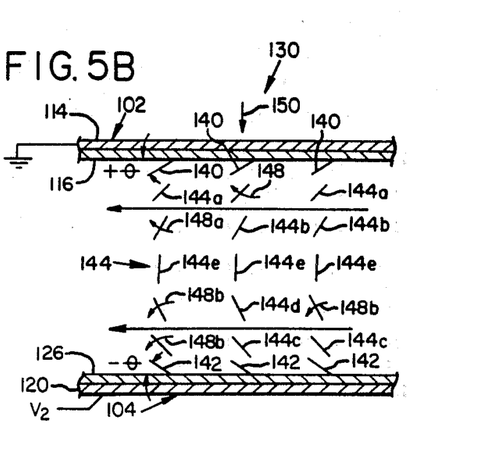

With reference to FIGS. 5A and 5B, the nematic director alignment configuration of layers 116 and 126 in liquid crystal cell segment 130 is described in Column 7, lines 48–55, of U.S. Pat. No. 4,333,708 of Boyd et al. It will be understood, however, that the liquid crystal cell described in the Boyd et al. patent differs from that of the present invention in that the former includes an alternating-tilt geometry type configuration of which the director alignment of liquid crystal cell 100 comprises only a portion. The cell of the Boyd et al. patent is constructed to promote disclination movement within the cell in an attempt to provide a bistable switching device.

The film layer 116 of electrode structure 102 is conditioned so that the electrode structure surface contacting directors 140 are aligned parallel to each other at a tilt bias angle $+\theta$, which is measured in the counterclockwise sense with reference to the surface of film layer 116. The film layer 126 of electrode structure 104 is conditioned so that the electrode structure surface contacting directors 142 are aligned parallel to each other at a tilt bias angle $-\theta$, which is measured in the clockwise sense with reference to the surface of film layer 126. Thus, cell segment 130 is fabricated so that the surface contacting directors 140 and 142 of the opposed surfaces of director alignment layers 116 and 126 of electrode structures 102 and 104, respectively, are tilt-biased in opposite directions.

A first preferred method of effecting the desired alignment of the surface contacting directors entails the use of polyimide as the material which comprises the alignment film layers 116 and 126 on electrode structures 102 and 104, respectively. Each alignment film layer is rubbed to produce a tilt bias angle $|\theta|$, with 2° to 5° being the preferred range. A second preferred method of effecting the desired alignment of the surface contacting directors entails the use of silicon monoxide as the material which comprises the alignment film layers 116 and 126 of electrode structures 102 and 104, respectively. The silicon monoxide layer is evaporated and vapor deposited preferably at a 5° angle measured from the electrode structure surface in an amount sufficient to produce a tilt bias angle $|\theta|$ of between 10° to 30°, with 15° to 25° being the preferred range.

It will be appreciated that methods for depositing silicon monoxide or other alignment materials to align liquid crystal molecules in a predetermined direction have been disclosed previously by others and are known to those having ordinary skill in the art. One such method, for example, is disclosed in U.S. Pat. No. 4,165,923 of Janning.

FIG. 5A depicts the orientation of surface noncontacting directors 144 when an AC signal $V_1$ of approximately 2 kHz and 20 Vrms is applied to conductive layers 114 and 120 of electrode structures 102 and 104, respectively. The signal $V_1$ on conductive layer 120 with conductive layer 114 grounded constitutes a first switching state produced at the output 48 of switching circuit 46 and produces an alternating electric field, E, between electrode structures 102 and 104 within the cell segment 130 to force the cell segment into its "ON" optical retardation state. A substantial number of the surface noncontacting directors 144 of a liquid crystal material 110 which has a positive anisotropy value align essentially end-to-end along direction 146 of the electric field flux lines within the cell segment, which direction is normal to the conditioned surfaces of the electrode structures. Thus, when cell segment 130 is excited into its "ON" optical retardation state, the surface noncontacting directors 144 are aligned perpendicularly to the surfaces of the cell segment.

FIG. 5B depicts the orientation of surface noncontacting directors 144 after the signal $V_1$ is removed and electrode structure 104 is held at ground potential so that the alignment of surface noncontacting directors is influenced not by an electric field produced between electrode structures 102 and 104 within the cell segment, but by the intermolecular elastic forces which cause relaxation of the surface noncontacting directors from the end-to-end alignment of the "ON" optical retardation state. The grounding of electrode structure 104 constitutes a second switching state produced at output 48 of switching circuit 46. The director orientation shown in FIG. 5B corresponds to that of the "OFF" optical retardation state of the cell segment.

Switching cell segment 130 to the "OFF" optical retardation state can also be accomplished by removing signal $V_1$, momentarily grounding electrode structure 104 to allow the liquid crystal material within the cell segment to quickly relax to the "OFF" state, and applying to layer 120 of the cell segment an AC bias voltage signal $V_2$ produced at output 48 of switching circuit 46 having a voltage level which is less than that of signal $V_1$ and generally about 1.0 Vrms. This value of signal $V_2$ maintains the orientation of the liquid crystal molecules of the cell segment to keep it in the "OFF" state. The frequency of signal $V_2$ is generally the same as that of signal $V_1$.

During the transition from the "ON" optical retardation state to the "OFF" optical retardation state of the cell segment, the surface noncontacting directors recede from the end-to-end alignment normal to the electrode structure surfaces and attempt to assume a generally parallel relation with the adjacent directors. Thus, surface noncontacting directors 144a and 144b rotate in a clockwise sense as shown by direction arrows 148a in order to achieve a near-parallel relation as respects directors 140 and 144a, respectively; and surface noncontacting directors 144c and 144d rotate in a counterclockwise sense as shown by direction arrows 148b to achieve a near-parallel relation as respects directors 142 and 144c, respectively. Thus, when cell segment 124 relaxes to its "OFF" optical retardation state, each one of a substantial number of the surface noncontacting directors is aligned so that it projects a director component onto the surfaces of the cell segment. The surface noncontacting directors, however, lie approximately in a plane which is perpendicular to the surfaces of the cell segment.

The method of operating the liquid crystal cell segment 130 as a zero to substantially half-wave optical retarder is directed to the disclination-free surface noncontacting director relaxation from the electric field-aligned or "ON" optical retardation state depicted by FIG. 5A to the planar configuration or "OFF" optical retardation state depicted by FIG. 5B.

In the present invention, liquid crystal cell segment 130 is operated as a zero to substantially half-wave optical retarder whose optic axis corresponds to the alignment direction of the nonsurface contacting directors 144.

Linearly polarized light which propagates in direction 150 normal to the surfaces of electrode structures 102 and 104 is coincident with the direction of surface noncontacting directors 144 when the liquid crystal cell segment is in the "ON" optical retardation state. Directors 144 are oriented in such "ON" optical retardation state so that there is a negligible projection of the optic axis on the electrode structure surfaces of the cell segment. Under these conditions, liquid crystal cell segment 130 produces substantially reduced optical retardation for incident light propagating in the direction 150.

Linearly polarized light which propagates in direction 150 normal to the surfaces of electrode structures 102 and 104 is noncoincident with the alignment direction of surface noncontacting directors when the liquid crystal cell segment is in the "OFF" optical retardation state. Directors 144 are oriented in such "OFF" optical retardation state so that each one of a substantial number of them projects a component on the electrode structure surfaces of the cell segment. Under these conditions, liquid crystal cell segment 130 has an effective birefringence for generally normally incident light. The orientation of surface noncontacting directors 144 provides substantially half-wave optical retardation for light of the wavelength which satisfies the mathematical expression:

$$\Delta nd/\lambda = \tfrac{1}{2}$$

where d represents the thickness 152 and Δn represents the effective birefringence of the cell segment.

Design of Switching Circuit

Figure 6A:
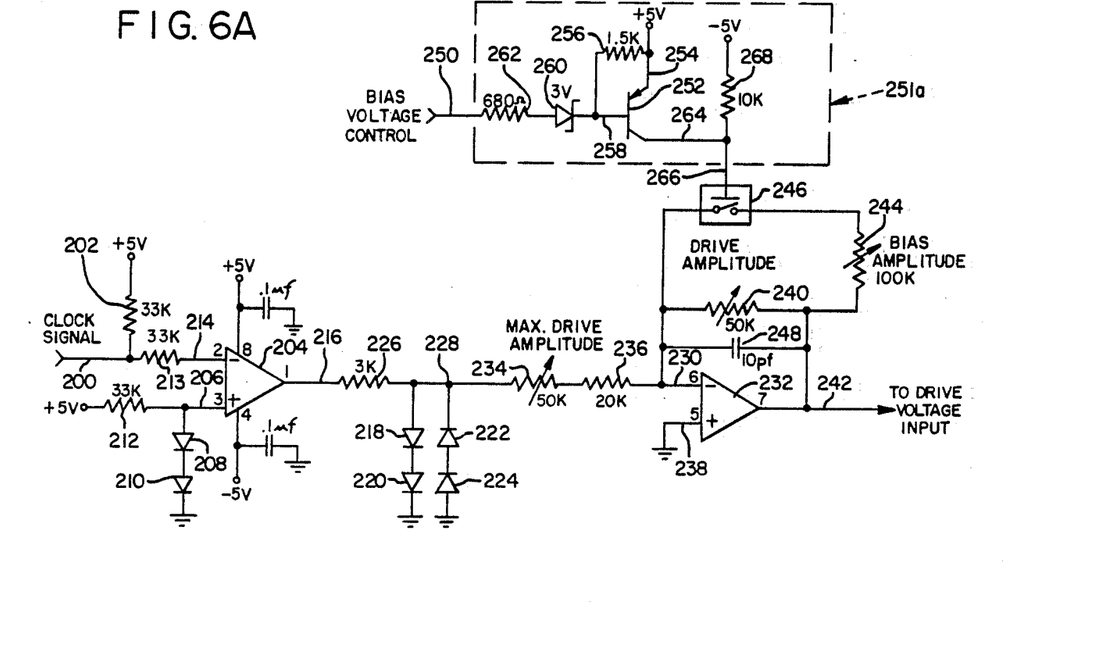
FIG. 6A is a schematic diagram of a subcircuit of the switching circuitry that develops a signal of selectable amplitude which is applied to a cell segment driver subcircuit of the switching circuitry.
Figure 6B:
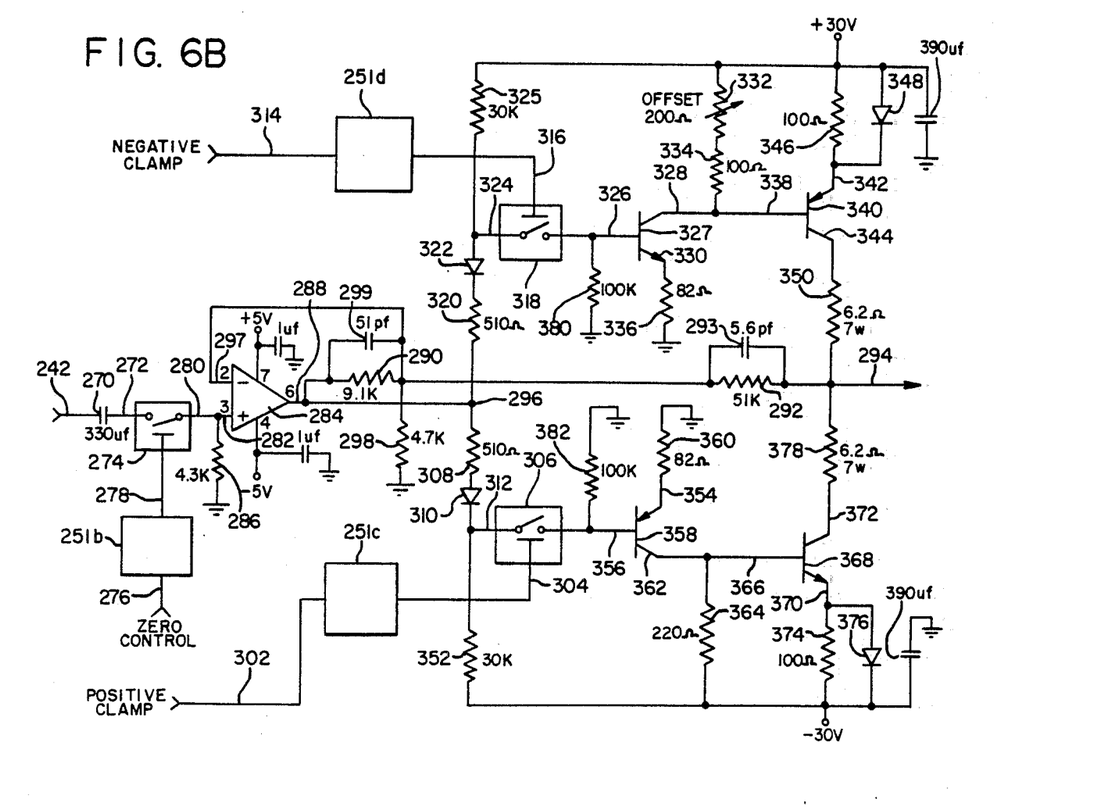
FIG. 6B is a schematic diagram of the cell segment driver subcircuit that receives the output signal from the subcircuit of FIG. 6A to develop the drive voltage signal to one of the cell segments of the liquid crystal device of FIG. 3.

FIGS. 6A and 6B are diagrams of the circuitry included in switching circuit 46 that develops at its outputs the drive voltage signals for cell segments 34 and 36. Switching circuit 46 includes two subcircuits of each type shown in FIGS. 6A and 6B to drive both cell segments of the liquid crystal cell. The logic signals shown in FIG. 2, lines A, B, D, F, H, J, and K are generated in accordance with conventional techniques and circuitry which are not described herein. The following discussion is directed only to the switching circuitry for cell segment 34.

FIG. 6A is a diagram of the subcircuit which develops the DRIVE VOLTAGE INPUT signal (FIG. 2, line C) of selectable amplitude, which is controlled by the BIAS VOLTAGE CONTROL signal (FIG. 2, line B). With reference to FIG. 6A, a clock signal with a 50% duty cycle and a frequency preferably of between 1 kHz and 4 kHz is applied to input terminal 200. The clock signal is provided by a signal generator (not shown) that develops a square wave output with TTL logic compatible voltage levels. The frequency of the clock signal determines the frequency of the DRIVE VOLTAGE signal (FIG. 2, line E) to cell segment 34. Resistor 202 serves as a pull-up resistance of 33 kilohms for the output of the clock signal generator. Operational amplifier 204 is configured as a voltage comparator which converts the clock signal from TTL logic voltage levels to a bipolar square wave signal centered about zero volts with an amplitude of approximately ±1.4 volts. A +1.4 volt comparator threshold level is applied to noninverting input 206 of amplifier 204. The threshold level is set by the voltage drop across diodes 208 and 210 which are connected in series to ground and are forward-biased by the +5 volt supply. Resistor 212 of 33 kilohms is connected in series with diodes 208 and 210 and limits the current flowing through them.

The clock signal is applied through resistor 213 of 33 kilohms to inverting input 214 of amplifier 204. Whenever the voltage of the clock signal at input 214 is greater than +1.4 volts, the voltage at output 216 of amplifier 204 is approximately −4.5 volts. Whenever the voltage of the clock signal at input 214 is less than +1.4 volts, the voltage at output 216 of amplifier 204 is approximately +4.5 volts. Diodes 218 and 220, which are connected in series between resistor 226 and ground, limit the positive voltage excursion of output 216 to +1.4 volts. Diodes 222 and 224, which are connected in series between resistor 226 and ground, limit the negative voltage excursion of output 216 to −1.4 volts. Resistor 226 is disposed between output 216 and diodes 218, 220, 222, and 224 and has a value of 3 kilohms to limit the current flowing through them. A bipolar square wave voltage signal having peak amplitudes of ±1.4 volts is, therefore, developed at node 228. Diodes 208, 210, 218, 220, 222, and 224 are 1N4152 or equivalent devices.

The bipolar square wave signal present at node 228 is applied to inverting input 230 of operational amplifier 232 through variable resistor 234 and fixed resistor 236, which are connected in series. Variable resistor 234 has a maximum value of 50 kilohms, and fixed resistor 236 has a value of 20 kilohms. The noninverting input 238 of operational amplifier 232 is connected direct to ground. Operational amplifier 232 is configured as an inverting amplifier whose closed loop gain can be selectably set to one of two amounts. The closed loop gain is set by the value of feedback variable resistor 240, which is at all times connected between output 242 and inverting input 230 of amplifier 232, and feedback variable resistor 244, which is connected between output 242 and inverting input 230 of amplifier 232 only when electronic switch 246 is commanded to its closed position. Variable resistors 240 and 244 have maximum values of 50 kilohms and 100 kilohms, respectively. Electronic switch 246 is preferably a CD4066 or equivalent device. Capacitor 248 of 10 pf is connected in parallel with variable resistor 240 to limit the bandwidth of amplifier 232 and thereby prevent it from oscillating. Operational amplifiers 204 and 232 are NE5532 or equivalent devices.

The closed loop gain of operational amplifier 232 is controlled by the logic state of the BIAS VOLTAGE CONTROL signal which is applied to input terminal 250 of a standard input buffer circuit 251a utilized in the circuitry shown in FIGS. 6A and 6B. Each such input buffer circuit is identified herein by reference numeral 251 followed by a different lower case letter. Input buffer circuit 251a comprises PNP transistor 252 whose emitter terminal 254 is connected direct to a +5 volt supply. Transistor 252 is a 2N3906 or equivalent device. A resistor 256 of 1.5 kilohms is disposed between emitter terminal 254 and base terminal 258 to bias transistor 252 as a switch. The switching control voltage applied to base terminal 258 is developed from the logic state of the BIAS VOLTAGE CONTROL signal at input terminal 250. A 3 volt Zener diode 260 is connected in series with resistor 262 of 680 ohms to control the voltage drop between the emitter and base terminals of transistor 252 as described below. The collector terminal 264 of transistor 252 is connected to switch control input 266 of electronic switch 246. Collector terminal 264 and switch control input 266 are connected to one end of resistor 268 of 10 kilohms which is connected at its other end to a −5 volt supply.

Whenever the BIAS VOLTAGE CONTROL signal is in the logic "1" state, input terminal 250 is approximately +3.5 volts. The +5 volt supply applied to emitter terminal 254 is inadequate to overcome the sum of the voltages of Zener diode 260 and the BIAS VOLTAGE CONTROL signal; therefore, no current flows through and no potential difference develops across resistor 256. This condition biases transistor 252 in its cutoff state and thereby causes approximately −5 volts to be applied to switch control input 266 of electronic switch 246. Under these conditions, electronic switch 246 is open and variable resistor 244 forms part of an open circuit that has no effect on amplifier 232. Variable resistor 240 is adjusted to provide at output 242 of amplifier 232 approximately a 4.0 volt peak-to-peak or 2.0 Vrms signal, which is the DRIVE VOLTAGE INPUT signal (FIG. 2, line C) that appears during the illustrated low impedance period from $T_5$ to $T_9$.

Whenever the BIAS VOLTAGE CONTROL signal is in the logic "0" state, input terminal 250 is near ground potential which causes current to flow through and a potential difference of approximately 2 volts to develop across resistor 256. This condition biases transistor 252 in its saturation state and thereby causes the formation of a conduction path between emitter terminal 254 and collector terminal 264 to deliver approximately +5 volts to switch control input 266 of electronic switch 246. Under these conditions, electronic switch 246 is closed and variable resistor 244 is connected in parallel with variable resistor 240. Connecting variable resistors 240 and 244 in parallel reduces the closed loop gain of operational amplifier 232. Variable resistor 244 is adjusted to provide at output 242 of amplifier 232 approximately a 0.4 volt peak-to-peak or 0.2 Vrms signal, which is the DRIVE VOLTAGE INPUT signal (FIG. 2, line C) that appears during the illustrated high impedance periods from $T_1$ to $T_5$ and from $T_9$ to $T_{13}$.

The DRIVE VOLTAGE INPUT signal is, therefore, present at all times at output 242 of amplifier 232 and is delivered to the input of the drive voltage circuitry of FIG. 6B. Variable resistor 234 provides an overall closed loop gain adjustment for the DRIVE VOLTAGE INPUT signal present at output 242 of amplifier 232 during both the low impedance and high impedance periods.

FIG. 6B is a diagram of the subcircuit which receives the DRIVE VOLTAGE INPUT signal from output 242 of amplifier 232 (FIG. 6A) and develops during the low impedance and high impedance periods the DRIVE VOLTAGE signal (FIG. 2, line E) that drives cell segment 34. With reference to FIG. 6B, the square wave DRIVE VOLTAGE INPUT signal is applied through coupling capacitor 270 of 330 μf to terminal 272 of electronic switch 274, which is a CD4066 or equivalent device. The ZERO CONTROL signal of cell segment 34 (FIG. 2, line D) is applied to input terminal 276 of input buffer circuit 251b whose output is applied to switch control input 278 of electronic switch 274. Terminal 280 of electronic switch 274 is connected to the noninverting input 282 of operational amplifier 284, which is a LM318 or equivalent device.

Whenever the ZERO CONTROL signal is in the logic "0" state, electronic switch 274 is closed and the signal present at terminal 272 is applied to noninverting input 282 of operational amplifier 284. Whenever the ZERO CONTROL signal is in the logic "1" state, electronic switch 274 is open and no signal appears at noninverting input 282 of amplifier 284. A resistor 286 of 4.3 kilohms is connected between noninverting input terminal 282 and ground to fix terminal 282 at zero volts when electronic switch 274 is open.

Output 288 of amplifier 284 is connected through resistor 290 of 9.1 kilohms and resistor 292 of 51 kilohms to output terminal 294 on which the DRIVE VOLTAGE signal for cell segment 34 appears and to the common input 296 of the complementary transistor circuitry which is described below. The junction node of resistors 290 and 292 is connected to inverting input 297 of amplifier 284 and to one lead of resistor 298 of 4.7 kilohms, whose other lead is connected to ground. This arrangement provides a noninverting feedback amplifier with resistor 290 as the feedback element that determines the closed loop gain in conjunction with resistor 298. Capacitor 299 of 51 pf is connected in parallel with resistor 290 to limit the bandwidth of amplifier 284 to prevent it from oscillating. Resistor 292 feeds back to inverting input 297 the signal present at output terminal 294 to regulate the amplitude of the DRIVE VOLTAGE signal. Capacitor 293 of 5.6 pf prevents the amplifier circuit from oscillating.

The POSITIVE CLAMP signal (FIG. 2, line J) is applied to input terminal 302 of input buffer circuit 251c whose output is connected to switch control input 304 of electronic switch 306. The signal present at output 288 of amplifier 284 is delivered through resistor 308 and temperature compensating diode 310, which are connected in series, to terminal 312 of electronic switch 306. The NEGATIVE CLAMP signal (FIG. 2, line K) is applied to input terminal 314 of input buffer circuit 251d whose output is connected to control input 316 of electronic switch 318. The signal present at output 288 of amplifier 284 is delivered through resistor 320 and temperature compensating diode 322, which are connected in series, to terminal 324 of electronic switch 318. Resistors 308 and 320 have values of 510 ohms, and diodes 310 and 322 are 1N4152 or equivalent devices.

The operation of the drive subcircuit of FIG. 6B can be explained with reference to certain combinations of the logic states of the signals that control the switching modes of electronic switches 246 (FIG. 6A), 274, 306, and 318.

The first of such input signal combinations relates to the generation of the 54 volt peak-to-peak DRIVE VOLTAGE signal applied during the low impedance period to electrode structure 30 of cell segment 34. For purposes of clarity, this signal is designated herein as the "low impedance DRIVE VOLTAGE signal." The low impedance DRIVE VOLTAGE signal is developed at output terminal 294 when the BIAS VOLTAGE CONTROL signal (FIG. 2, line B) is in the logic "1" state, which produces a 4.0 volt peak-to-peak signal at output 242 of amplifier 232; the ZERO CONTROL signal (FIG. 2, line D) is in the logic "0" state, which closes electronic switch 274 to apply the 4.0 volt peak-to-peak signal to noninverting input terminal 282 of amplifier 284; the POSITIVE CLAMP signal (FIG. 2, line J) is in the logic "0" state, which closes electronic switch 306; and the NEGATIVE CLAMP signal (FIG. 2, line K) is in the logic "0" state, which closes electronic switch 318. Under these conditions, an amplified version of the low impedance DRIVE VOLTAGE INPUT signal appears at output 294.

Whenever the voltage at output 288 of amplifier 284 is greater than approximately +1 volt, the voltage across resistor 325 of 30 kilohms, which is disposed between a +30 volt supply and base terminal 326 of NPN transistor 327, decreases, thereby to develop a sufficient voltage at base terminal 326 to cause current to flow from collector terminal 328 to emitter terminal 330. Variable resistor 332 and fixed resistor 334 are connected in series and are disposed between the +30 volt supply and collector terminal 328 to limit the amount of current flowing through transistor 327. Variable resistor 332 is adjustable to balance the current flowing into output terminal 294. Resistor 336 is disposed between emitter terminal 330 and ground also to limit the current flowing through transistor 327. Variable resistor 332 has a maximum value of 200 ohms, and resistors 334 and 336 are 100 ohms and 82 ohms, respectively.

Collector terminal 328 of transistor 327 is connected to base terminal 338 of PNP transistor 340. Whenever current flows through the collector of transistor 327, current also flows from emitter terminal 342 to collector terminal 344 of transistor 340 and approximately +27 volts appear at output terminal 294. Resistor 346 of 100 ohms is disposed between the +30 volt supply and collector terminal 342 of transistor 340 to set its bias current. Diode 348 is connected in parallel with resistor 346 and limits the voltage drop across it to 0.7 volts to ensure that the +27 volts appear at output terminal 294 under peak current load conditions. Resistor 350 of 6.2 ohms is connected between collector terminal 344 and output terminal 294 to limit the current flowing through transistor 340. Under these conditions, resistor 350 establishes the impedance at output terminal 294.

Whenever the voltage at output 288 of amplifier 284 is greater than approximately +1 volt, an insufficient amount of current flows through resistor 352 of 30 kilohms to develop the necessary voltage of greater than approximately 0.5 volts across emitter terminal 354 and base terminal 356 of PNP transistor 358 to cause current to flow from emitter terminal 354 to collector terminal 362. Emitter terminal 354 of transistor 358 is connected to ground through resistor 360 of 82 ohms. Collector terminal 362 of transistor 358 is connected to a −30 volt supply through resistor 364 of 220 ohms and to base terminal 366 of NPN transistor 368. Under these conditions, base terminal 366 of transistor 368 is held near −30 volts and is thereby biased in the cutoff state. No current flows to emitter terminal 370 from collector terminal 372 of transistor 368.

Resistor 374 is disposed between the −30 volt supply and emitter terminal 370 of transistor 368 to set the bias current when a sufficient voltage is applied across its emitter and base terminals. Diode 376 is connected in parallel with resistor 374 and limits the voltage drop across it to 0.7 volts to ensure that −27 volts appear at output terminal 294 under peak current load conditions. Resistor 378 of 6.2 ohms is connected between collector terminal 372 and output terminal 294 to limit the current flowing through transistor 368 when it is biased into its conducting state. Under these conditions, resistor 378 establishes the impedance at output terminal 294. Diodes 348 and 376 are 1N4935 or equivalent devices, and resistors 350 and 378 have a 7 watt power rating.

In summary, whenever the voltage present at output 288 of amplifier 284 is greater than +1 volt, transistor 340 is biased to cause current to flow from the emitter to the collector terminals and becomes a low impedance source of +27 volts which appear at output terminal 294. Transistor 368 is biased in the cutoff state and, therefore, does not influence the signal developed at output terminal 294 under these conditions.

On the other hand, whenever the voltage at output 288 of amplifier 284 is less than approximately −1 volt, transistors 327 and 340 are biased in the cutoff state in a manner analogous to that described above for transistors 358 and 368 when the voltage at output 288 is greater than approximately +1 volt. Similarly, whenever the voltage at output 288 of amplifier 284 is less than approximately −1 volt, transistors 358 and 368 are biased to cause current to flow through the devices in a manner analogous to that described above for transistors 327 and 340 when the voltage at output 288 is greater than approximately +1 volt.

In summary, whenever the voltage present at output 288 is less than −1 volt, transistor 368 is biased to cause current to flow from the emitter to the collector terminals and becomes a low impedance source of −27 volts which appear at output terminal 294. Transistor 340 is biased in the cutoff state and, therefore, does not influence the signal developed at output terminal 294 under these conditions.

The second input signal combination relates to the generation of the 5.4 volt peak-to-peak DRIVE VOLTAGE signal applied during the high impedance period to electrode structure 30 of cell segment 34. For purposes of clarity, this signal is designated herein as the "high impedance DRIVE VOLTAGE signal." The high impedance DRIVE VOLTAGE signal is developed at output terminal 294 when the BIAS VOLTAGE CONTROL signal (FIG. 2, line B) is in the logic "0" state, which produces a 0.4 volt peak-to-peak or 0.2 Vrms signal at output 242 of amplifier 232; the ZERO CONTROL signal (FIG. 2, line D) is in the logic "0" state, which closes electronic switch 274 to apply the 0.4 volt peak-to-peak signal to noninverting input terminal 282 of amplifier 284; the POSITIVE CLAMP signal (FIG. 2, line J), which oscillates in-phase with the 0.4 volt peak-to-peak DRIVE VOLTAGE INPUT signal and alternately opens and closes electronic switch 306; and the NEGATIVE CLAMP signal (FIG. 2, line K), which oscillates 180° out-of-phase with the 0.4 volt peak-to-peak DRIVE VOLTAGE INPUT signal and alternately opens and closes electronic switch 318 in a 180° out-of-phase relationship with the opening and closing of electronic switch 306. Under these conditions, an amplified version of the high impedance DRIVE VOLTAGE INPUT signal appears at output 294.

Whenever the POSITIVE CLAMP signal is in the logic "0" state and the NEGATIVE CLAMP signal is in the logic "1" state, electronic switch 306 is closed and electronic switch 318 is open. Additionally, a −0.1 volt signal appears at output 288 of amplifier 284. Since electronic switch 318 is open, no signal appears at base terminal 326 of transistor 327, which as a consequence is biased in the cutoff state. Resistor 380 of 100 kilohms is connected between base terminal 326 and ground to keep the base terminal at zero volts while electronic switch 318 is open. Transistor 340 is also biased in the cutoff state; therefore, no current flows from collector 344 into output terminal 294. Thus, transistor 340 has no influence on the voltage developed at output terminal 294.

Since electronic switch 306 is closed, the −0.1 volt signal appears at base terminal 356 of transistor 358 and causes current to flow from emitter terminal 354 to collector terminal 362. The current flowing through collector terminal 362 develops across resistor 364 a voltage of sufficient magnitude to bias transistor 368 as a linear amplifier, and −2.7 volts appear at output terminal 294. Under these conditions, the impedance at output terminal 294 is approximately 60 kilohms (which represents the sum of the resistances of resistors 290 and 292) for drive voltages of about −2.7 volts. (As indicated above, the impedance at output terminal 294 is 6.2 ohms under conditions which produce drive voltages of less than −2.7 volts.)

As shown in FIG. 2, line E, from $T_1$ to $T_2$ and from $T_{11}$ to $T_{13}$ the pulse top of the DRIVE VOLTAGE signal overshoots at its leading and trailing edges and sags to its nominal peak amplitude of $|2.7|$ volts. This is the result of the electrical cross talk induced by the noise voltage produced on common electrode structure 22 by the 54 volt peak-to-peak signal applied to cell segment 36 (line I) during those times. Whenever such cross talk occurs, it is the function of the driver subcircuit of FIG. 6B to provide a modified replica of the cross talk voltage at output terminal 294. The driver subcircuit is designed to superimpose the noise voltage on the nominal DRIVE VOLTAGE signal at output terminal 294 only as long as the absolute value of the composite signal voltage equals or exceeds that of the nominal DRIVE VOLTAGE signal. The driver subcircuit otherwise rejects the effect of the noise voltage signal. Thus, the noise voltage signal induced on electrode structure 30 of cell segment 34 closely tracks that induced on common electrode structure 22, and no change in potential difference occurs across cell segment 34 that would cause it to drift from the "OFF" state. The result is the elimination of optical cross talk between cell segments 34 and 36.

The voltage at output terminal 294 is, therefore, clamped to no greater than −2.7 volts when the POSITIVE and NEGATIVE CLAMP signals are in the logic "0" and logic "1" states, respectively. This function of the driver subcircuit is accomplished as follows. A cross talk voltage induced on electrode structure 30 appears on output terminal 294 and is fed back through resistor 292 to inverting input 297 of amplifier 284. When the cross talk voltage is less than zero, amplifier 284 senses that the voltage at output terminal 294 is too low and attempts to increase it by developing a higher voltage at its output 288. The increase in voltage cannot be accomplished, however, because the logic "1" state of the NEGATIVE CLAMP signal commands electronic switch 318 to the open position which biases transistor 340 in its cutoff state. Thus, the negative cross talk voltage is superimposed on the DRIVE VOLTAGE signal to cell segment 34. When the cross talk voltage is greater than zero, amplifier 284 senses that the voltage at output terminal 294 is too high and attempts to decrease it by developing a lower voltage at its output 288. The decrease in voltage can be accomplished because the logic "0" state of the POSITIVE CLAMP signal commands electronic switch 306 to the closed position which biases transistor 368 as a linear amplifier that decreases the voltage appearing on output terminal 294. Thus, the positive cross talk voltage is compensated for and the voltage at output terminal 294 is clamped to that of the DRIVE VOLTAGE signal.

Whenever the POSITIVE CLAMP signal is in the logic "1" state and the NEGATIVE CLAMP signal is in the logic "0" state, electronic switch 306 is open and electronic switch 318 is closed. Additionally, a +0.1 volt signal appears at output 288 of amplifier 284. Since electronic switch 306 is open, no signal appears at base terminal 356 of transistor 358, which as a consequence is biased in the cutoff state. Resistor 382 of 100 kilohms is connected between base terminal 356 and ground to keep the base terminal at zero volts while electronic switch 306 is open. The above-described operation of the circuit when the POSITIVE CLAMP and NEGATIVE CLAMP signals are in the logic "0" and logic "1" states, respectively, is analogous to that when the POSITIVE and NEGATIVE CLAMP signals are in the logic "1" and logic "0" states, respectively. Thus, a +0.1 volt signal appears at output 288 of amplifier 284, and when no appreciable cross talk appears on common electrode structure 22, +2.7 volts appear at output terminal 294. Under these conditions, the impedance at output terminal 294 is approximately 60 kilohms for drive voltages of about +2.7 volts. (As indicated above, the impedance at output terminal 294 is 6.2 ohms under conditions which produce drive voltages of greater than +2.7 volts.) The voltage at output terminal 294 is clamped to no less than +2.7 volts when the cross talk voltage is induced from $T_1$ to $T_2$ and from $T_{11}$ to $T_{13}$.

The third input signal combination relates to the generation of a momentary high impedance ground state immediately following the cessation of the low impedance DRIVE VOLTAGE signal for electrode structure 30 of cell segment 34. The high impedance ground state is developed at output terminal 294 under the same input signal conditions as described above for the high impedance DRIVE VOLTAGE signal with the exception that the ZERO CONTROL signal (FIG. 2, line D) is in the logic "1" state.

As shown in FIG. 2, line D, the ZERO CONTROL signal is in the logic "1" state from $T_9$ to $T_{11}$ to command electronic switch 274 to the open position. Under these conditions, no signal is applied to noninverting input 282 of amplifier 284, which input is connected through resistor 286 to ground. A signal of approximately zero volts appears at output 288 of amplifier 284. The ZERO CONTROL signal is in the logic "1" state only during the high impedance period; therefore, the operation of the driver subcircuit of FIG. 6B is the same as that described above for the second input signal combination, with the exception that the DRIVE VOLTAGE signal is zero volts. The signal appearing at output terminal 294 is, therefore, called a "high impedance ground."

The cross talk signal is superimposed on the DRIVE VOLTAGE signal of approximately zero volts. As shown in FIG. 2, line I, the low impedance DRIVE VOLTAGE signal applied to cell segment 36 from $T_7$ to $T_{13}$ induces a bipolar noise signal at output terminal 294 from $T_{10}$ to $T_{11}$. There is no induced noise voltage signal on electrode structure 30 in the high impedance ground state from $T_9$ to $T_{10}$ because the negative-going transition of the low impedance DRIVE VOLTAGE signal (line I) to cell segment 36 occurs simultaneously with the change from the low impedance DRIVE VOLTAGE signal to the high impedance ground state of cell segment 34. From $T_9$ to $T_{11}$, there is, therefore, no net change in potential difference across cell segment 34 and no optical cross talk between the cell segments.

With reference to FIG. 2, line I, it will be appreciated that from $T_2$ to $T_3$ the DRIVE VOLTAGE signal to cell segment 36 remains at zero volts in the absence of any induced noise voltage signal because only the low impedance DRIVE VOLTAGE signal (line E) applied to cell segment 34 is present during that time.

It will be obvious to those having skill in the art that many changes may be made in the above-described details of the preferred embodiment of the present invention. The scope of the present invention, therefore, should be determined only by the following claims.

We claim:

1. In an optical display system comprising a liquid crystal switching device which includes a liquid crystal material captured between a pair of spaced-apart and generally parallel transparent substrates, one substrate comprising first and second electrode structures and the other substrate comprising a common electrode structure, the first and common electrode structures defining a first cell segment and the second and common electrode structures defining a second cell segment, a method for sequentially electrically driving the first and second cell segments to reduce optical cross talk between the segments during operation of the display system, comprising the steps of:
    applying an excitation potential difference between the first and common electrode structures of the first cell segment during a first time interval to bias the first cell segment to its "ON" state;
    applying an excitation potential difference between the second and common electrode structures of the second cell segment during a second time interval to bias the second cell segment to its "ON" state; and introducing between the first and common electrode structures of the first cell segment during the second time interval a high impedance condition for at least part of the time while the second cell segment is biased in its "ON" state, thereby to optically isolate the first and second cell segments.

2. The method of claim 1 further comprising:
introducing between the second and common electrode structures of the second cell segment after the second time interval a high impedance condition to optically isolate the first and second cell segments.

3. The method of claim 2 further comprising repeating all of the aforesaid steps of claims 1 and 2.

4. The method of claim 1 in which the second time interval overlaps a portion of the first time interval.

5. The method of claim 1 in which the high impedance condition is developed by a voltage source having a high output impedance, the voltage source providing a potential difference that allows the first cell segment to relax to its "OFF" state.

6. The method of claim 5 in which the potential difference is approximately zero volts.

7. The method of claim 5 in which the voltage source is operable also to provide a bias voltage signal of sufficient amplitude to maintain the first cell segment in its "OFF" state.

8. The method of claim 7 in which the bias voltage signal is an AC signal.

9. An optical switching system including a liquid crystal device that receives from a light source light rays in a defined polarization state, wherein the device comprises:
first and second contiguous cell segments, the first cell segment including a first separate electrode structure and a common electrode structure therebetween and a liquid crystal material captured therebetween and the second cell segment including a second separate electrode structure and the common electrode structure having a liquid crystal material captured therebetween; and wherein the switching system comprises:
switching means in communication with the first separate electrode structure for applying a first signal to the first cell segment to change the character of the polarization state of the light rays passing therethrough and with the second separate electrode structure for applying a second signal to the second cell segment to change the character of the polarization state of light rays passing therethrough, the switching means being operable to apply the first and second voltage signals in a manner to separately change the character of the polarization state of the light rays passing through each one of the cell segments and being operable to induce on the separate electrode structure of one of the cell segments a signal of the character of a noise voltage signal induced on the common electrode structure by the signal applied to the separate electrode structure of the other cell segment, thereby to optically isolate the cell segments by minimizing any change in character of the polarization state of the light rays passing through the one cell segment resulting from a change in the character of the polarization state of the light rays passing through the other cell segment.

10. The switching system of claim 9 in which the switching means operates to optically isolate the cell segments during a change in the polarization state of light rays passing through the second cell segment by
applying the first signal during a first time interval to bias the first cell segment to its "ON" state;
applying the second signal during a second time interval to bias the second cell segment to its "ON" state; and
introducing during the second time interval a high impedance condition between the first separate electrode structure and common electrode structure for at least part of the time while the second cell segment is biased in its "ON" state.

11. The switching system of claim 10 in which the second time interval overlaps a portion of the first time interval.

12. The switching system of claim 10 in which the high impedance condition is developed by a voltage source having a high output impedance, the voltage source providing a potential difference that allows the first cell segment to relax to its "OFF" state.

13. The switching system of claim 12 in which the potential difference is approximately zero volts.

14. The switching system of claim 10 in which the voltage source is operable also to provide a bias voltage signal of sufficient amplitude to maintain the first cell segment in its "OFF" state.

15. The switching system of claim 14 in which the bias voltage signal is an AC signal.

16. The switching system of claim 9 in which each one of the first and second cell segments comprises a variable optical retarder whose retardation changes in response to a change in the signal applied to the cell segment by the switching means.

17. The switching system of claim 16 in which the liquid crystal material of each cell segment has directors and each electrode structure of the cell segment includes a layer of optically transparent and electrically conductive material and has the inner surface thereof conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to the tilt bias angles of the directors in contact with the other conditioned surface.

18. The switching system of claim 16 in which the variable optical retarder provides zero retardation of light rays passing therethrough in response to a first voltage level of the signal applied by the switching means and provides half-wave retardation of light rays of a predetermined wavelength passing therethrough in response to a second voltage level of the signal applied by the switching means.

19. A high-speed color switch which receives light of a plurality of wavelengths emitted from a light source, comprising:
first and second light polarizing means in optical communication with the light source, the first light polarizing means including a color selective polarizing filter;
variable optical retarding means disposed between the first and second light polarizing means, the variable optical retarding means including a liquid crystal cell comprising first and second contiguous cell segments, the first cell segment including a first electrode structure and a common electrode structure having a liquid crystal material captured therebetween and the second cell segment including a second electrode structure and the common electrode structure having a liquid crystal material captured therebetween; and switching means in communication with the first and second electrode structures for applying a separate potential difference to each cell segment, thereby to selectably transmit a light output of one of two colors through the first cell segment during a first time interval and a light output of one of two colors through the second cell segment during a second time interval.

20. The color switch of claim 19 which also includes means in communication with the light source for generating image color information and means for synchronizing to the switching means the image color information carried by the light rays emitted from the light source, thereby to develop during the first and second time intervals a composite image having a multicolored appearance.

21. The color switch of claim 19 in which the color selective polarizing filter of the first light polarizing means comprises first and second linear polarizers having orthogonally aligned polarization axes, the polarization axis of the first linear polarizer passing light of a first color and the polarization axis of the second linear polarizer passing light of a second color.

22. The color switch of claim 21 in which the second light polarizing means comprises a neutral linear polarizing filter and the switching means provides first and second switching states to each one of the cell segments of the variable optical retarding means to produce first and second amounts of optical retardation for transmitting from each cell segment light rays which exit the color switch in the first and second colors.

* * * * *